(12) United States Patent
Lee et al.

(10) Patent No.: US 7,033,111 B2
(45) Date of Patent: Apr. 25, 2006

(54) HYDRAULIC POWER GENERATING SYSTEM

(76) Inventors: Koo Shik Lee, 340-1, Jangan-Dong, Dongdaemoon-Ku, Seoul (KR); Dae Hoon Lee, 340-1, Jangan-Dong, Dongdaemoon-Ku, Seoul (KR)

(*) Notice: Subject to any disclaimer, the term of this patent is extended or adjusted under 35 U.S.C. 154(b) by 0 days.

(21) Appl. No.: 10/929,500

(22) Filed: Aug. 31, 2004

(65) Prior Publication Data
US 2005/0147471 A1    Jul. 7, 2005

(30) Foreign Application Priority Data
Sep. 23, 2003  (KR) .................... 10-2003-0065923

(51) Int. Cl.
*E02B 9/08* (2006.01)
(52) U.S. Cl. .......................... 405/76; 405/75
(58) Field of Classification Search ............. 405/75, 405/76; 60/499, 498, 496, 495; 290/53, 290/54, 42, 43
See application file for complete search history.

(56) References Cited

U.S. PATENT DOCUMENTS

| | | | | |
|---|---|---|---|---|
| 1,081,118 A | * | 12/1913 | Howe | .......................... 60/499 |
| 1,439,416 A | * | 12/1922 | Hess | .......................... 415/3.1 |
| 3,882,320 A | * | 5/1975 | Schmeller | ..................... 290/43 |
| 4,698,516 A | * | 10/1987 | Thompson | .................... 290/54 |
| 5,311,064 A | * | 5/1994 | Kumbatovic | ................. 290/53 |
| 5,684,335 A | * | 11/1997 | Ou | .............................. 290/54 |
| 5,789,826 A | * | 8/1998 | Kumbatovic | ................ 60/499 |

* cited by examiner

Primary Examiner—Frederick L. Lagman
(74) Attorney, Agent, or Firm—Bacon & Thomas

(57) ABSTRACT

A hydraulic power generating system designed to minimize equipment costs by simplifying the configuration thereof, to maximize efficiency of power generation by reducing loss in hydraulic power, and to allow economical and convenient maintenance of the system. The system comprises a power generator, a buoy floating the power generator on the surface of the water, and a fixing apparatus restricting movement of the buoy and the power generator. The power generator comprises a looped rail, a plurality of pulleys moving along the rail, a coupler to join the plurality of pulleys, a plurality of wings, each being installed to each of the pulleys to move the pulley by absorbing flow energy of water, and a generator installed in the rail to generate electricity after receiving kinetic energy of the pulleys through power transmission gears. The system is enhanced in its configuration, allowing economical and convenient maintenance of the hydraulic power generating system, while not being restricted as to the location where the power generator may be installed.

4 Claims, 6 Drawing Sheets

HYDRAULIC POWER GENERATING SYSTEM

BACKGROUND OF THE INVENTION

1. Field of the Invention

The present invention relates to a hydraulic power generating system for generating power using potential energy of water and variation in level of water caused by the tides, and, more particularly, to a hydraulic power generating system designed to minimize equipment costs by simplifying configuration, to maximize efficiency of power generation by reducing loss in hydraulic power, and to allow economical and convenient maintenance of the hydraulic power generating system.

2. Description of the Related Art

Hydraulic power generates electricity using potential energy of water located in a high place. That is, as the water rotates a water turbine by the falling force of the water falling from the high place, a generator equipped to the shaft of the water turbine is rotated to generate electricity. Although there are many kinds of water turbines, Francis turbines using a pressure of water are generally used in most power plants, a Pelton turbine rotating the water turbine with an impact of the water falling thereto is used. Additionally, a Kaplan turbine or a propeller turbine rotating the propeller is also used. In the case where the head drop is small but the volume of water is large, a bulb water turbine is used.

In hydraulic power, power generation is environmentally performed by the potential energy of the water, so that unlike terminal power generation, smoke is not generated, thereby reducing environmental contamination.

Furthermore, hydraulic power has merits of consistent generation of energy, lower operating costs for a power generator, and short period of time for power generation.

In spite of all these merits, there are problems in that high costs are required to build a dam for storing water, in that large areas for keeping water in the reservoir cause destruction of ecosystems, submergence of large area of land, such as historic relics, picturesque places, etc., and in that many people lose their homes.

Additionally, there are difficult problems associated with the selection of an appropriate place to build the dam, and of variations in energy depending on the amount of water kept in the reservoir.

SUMMARY OF THE INVENTION

The present invention has been made to solve the above problems, and it is an object of the present invention to provide a hydraulic power generating system, which allows power generation using water flowing in nature, thereby minimizing initial construction costs for establishing the hydraulic power generating system, and solving the problems of destruction of the ecosystem and of submergence of historic relics, picturesque places, and the homes of many people, and which is not restricted as to the location where the power generator may be installed.

In accordance with an aspect of the present invention, the above and other objects can be accomplished by the provision of a hydraulic power generating system, comprising: a power generator including a looped rail, a plurality of pulleys moving along the looped rail, a coupler to join the plurality of pulleys, a plurality of wings, each being installed to each of the pulleys to move the pulley by absorbing flow energy of water, and a generator installed in the rail to generate electricity after receiving kinetic energy of the pulleys through power transmission gears; a buoy floating the power generator on the surface of the water; and a fixing apparatus restricting movement of the buoy and the power generator.

BRIEF DESCRIPTION OF THE DRAWINGS

The foregoing and other objects and features of the present invention will be more clearly understood from the following detailed description taken in conjunction with the accompanying drawings, in which.

DESCRIPTION OF THE PREFERRED EMBODIMENTS

Preferred embodiments will now be described in detail with reference to the accompanying drawings.

Figure 1:
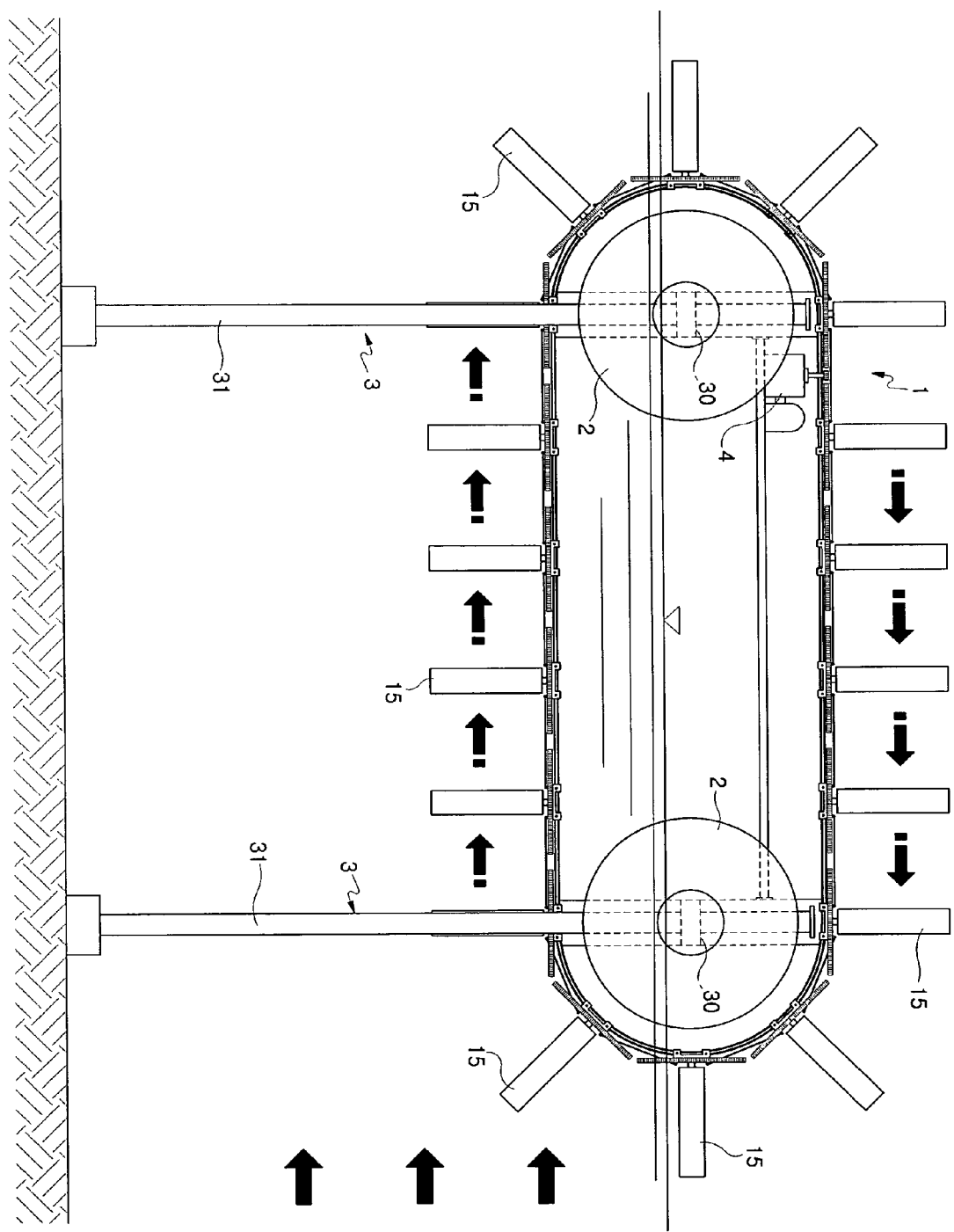
FIG. 1 is a side view illustrating a hydraulic power generating system according to the present invention.
Figure 2:
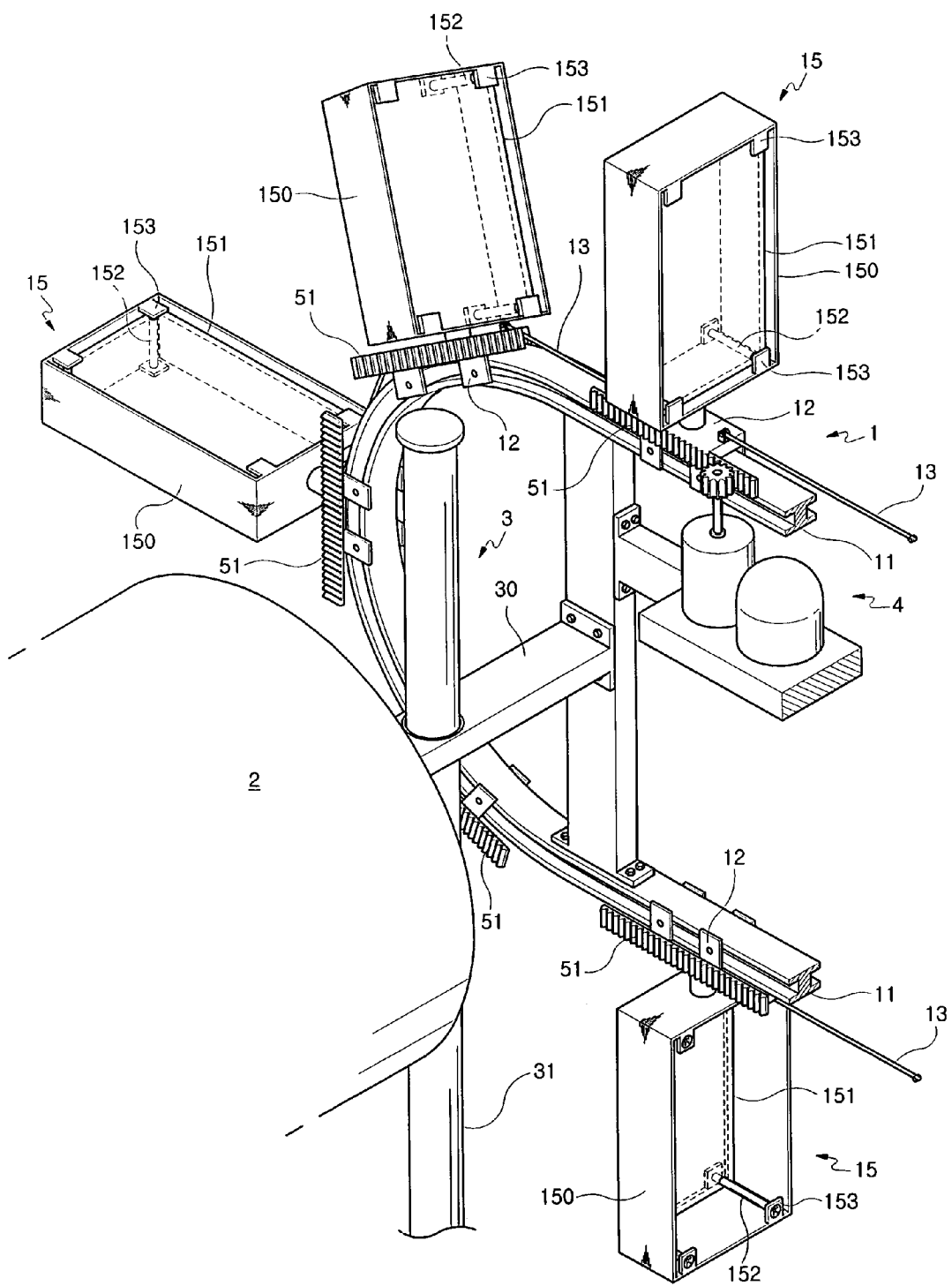
FIG. 2 is an exploded perspective view illustrating the main portion of the present invention.
Figure 3:
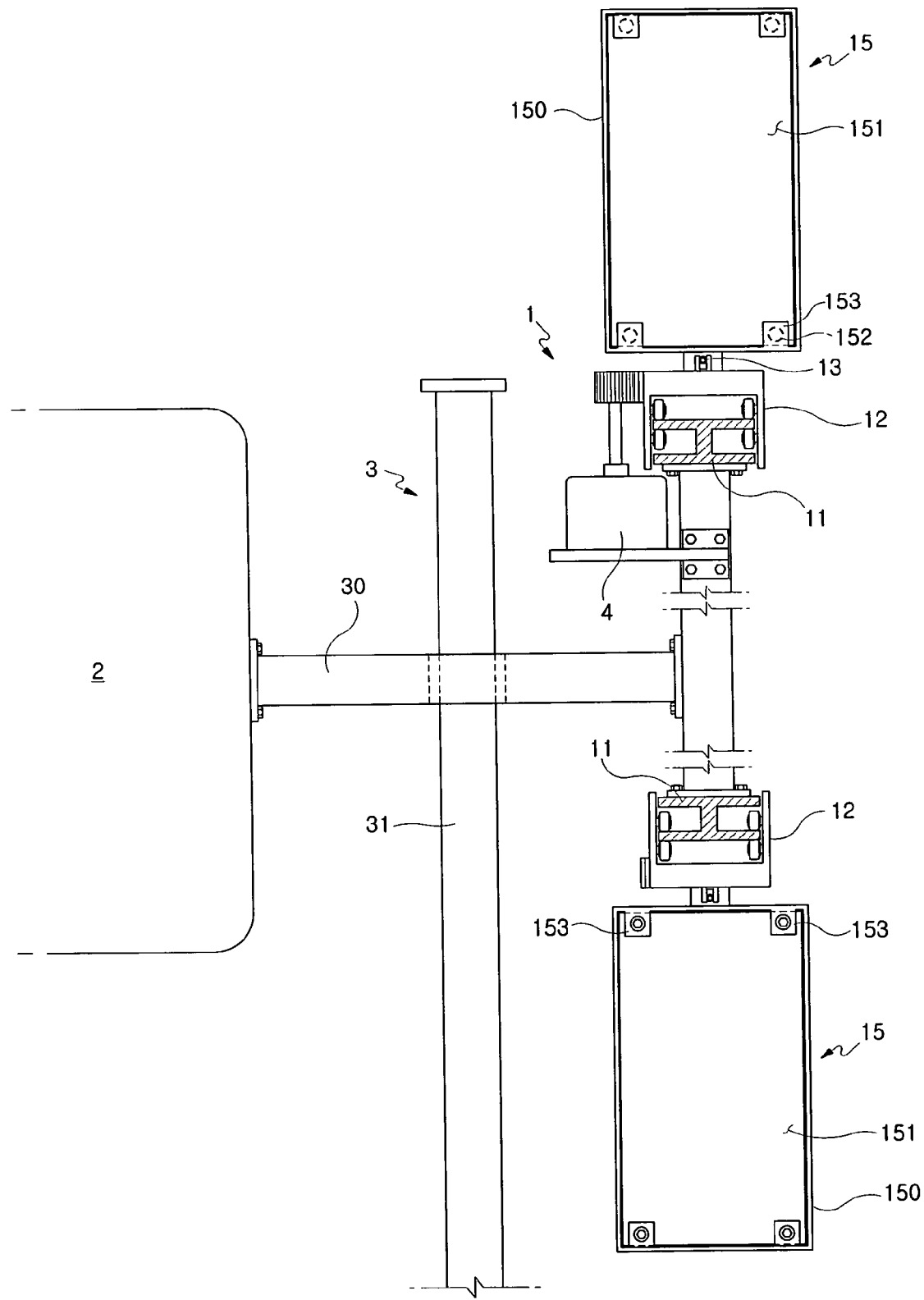
FIG. 3 is a cross-sectional view illustrating a state wherein the hydraulic power generating system is installed to a fixing apparatus of the present invention.
Figure 4:
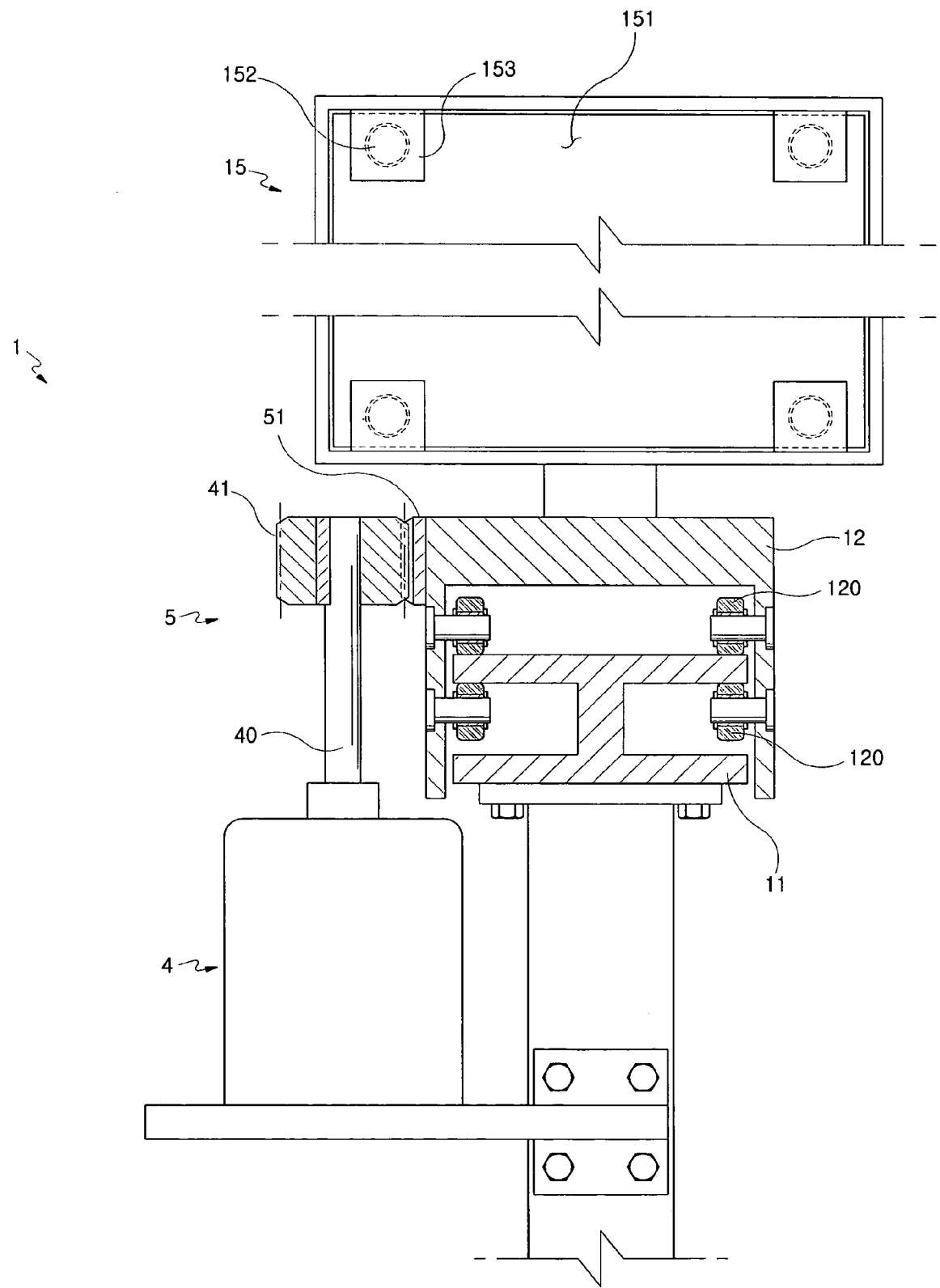
FIG. 4 is an enlarged cross-sectional view illustrating a pulley of the present invention.
Figure 5:
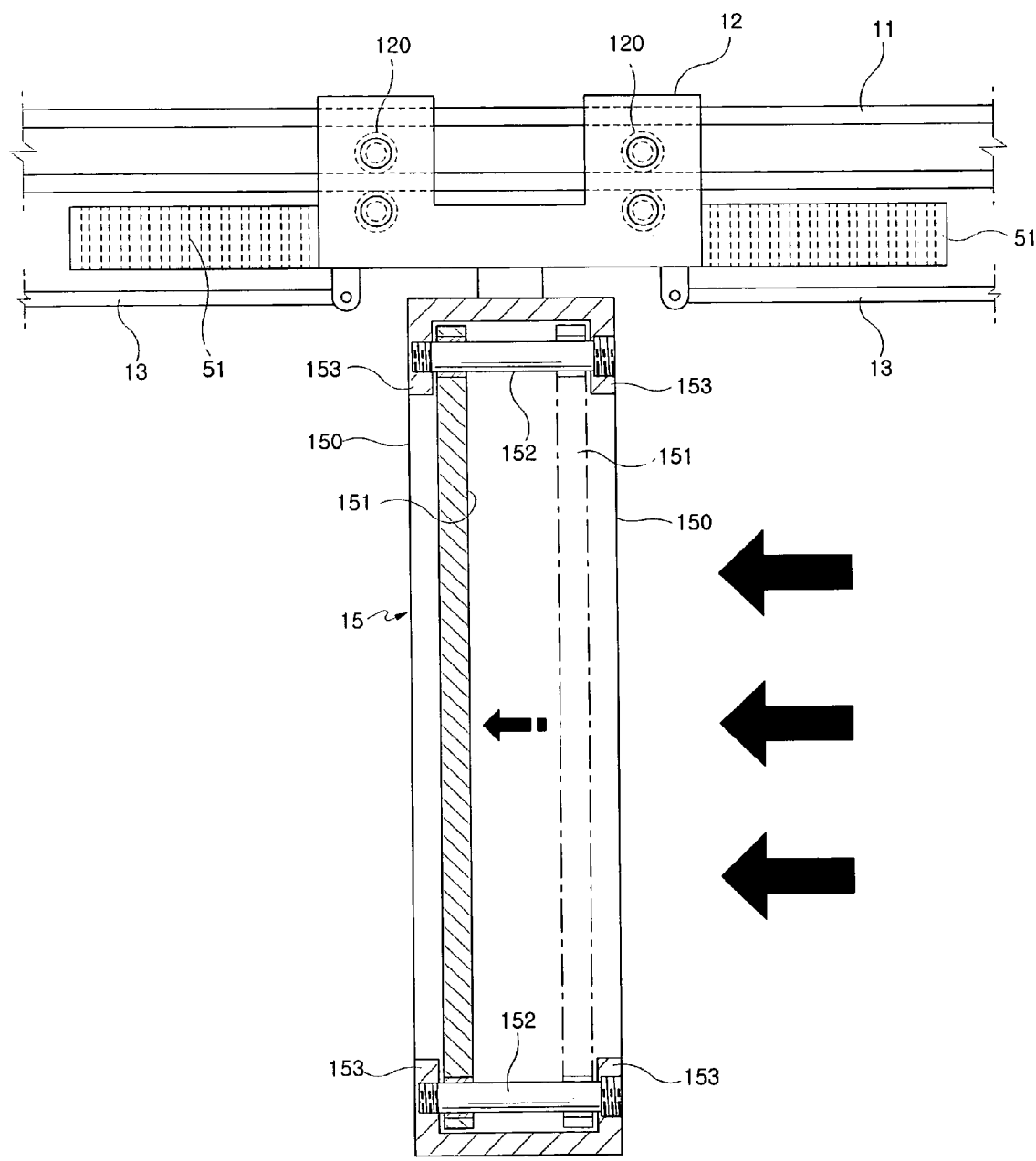
FIG. 5 is a cross-sectional view illustrating a wing, which is another main portion of the present invention.
Figure 6:
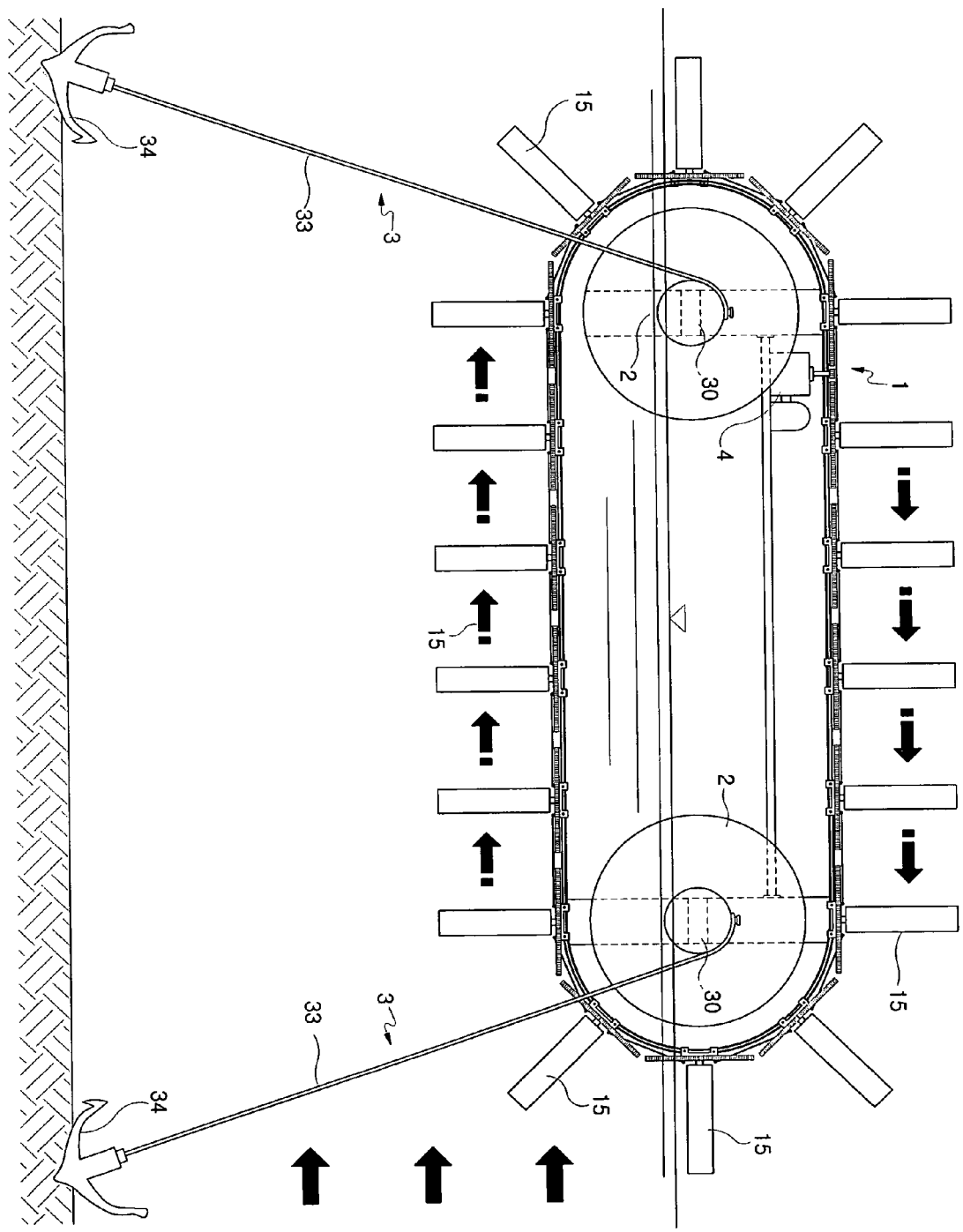
FIG. 6 is a side view illustrating another fixing apparatus of the present invention.

FIG. 1 is a side view illustrating a hydraulic power generating system according to the present invention, and FIG. 2 is an exploded perspective view illustrating the main portion of the invention. FIG. 3 is a cross-sectional view illustrating a state wherein the hydraulic power generating system is installed to a fixing apparatus of the invention, FIG. 4 is an enlarged cross-sectional view illustrating a pulley of the invention, and FIG. 5 is a cross-sectional view illustrating a wing, which is another main portion of the invention. FIG. 6 is a side view illustrating another fixing apparatus of the present invention.

Referring to FIGS. 1 to 6, the hydraulic power generating system of the invention includes two or more buoys 2 floating a power generator 1 on the surface of the water, and two or more fixing apparatuses 3 restricting the movement of the buoy 2 and the power generator 1. The power generator 1 comprises a looped rail 11, a plurality of pulleys 12 moving along the looped rail 11, a coupler 13 to join the plurality of pulleys 12, a plurality of wings 15, each of which is installed to each of the pulleys, to move the pulley by absorbing flow energy of water, and a generator 4 to generate electricity after receiving kinetic energy of the pulleys 12 through power transmission gears 5.

As shown in FIG. 2, each of the fixing apparatuses 3 may comprise a plate 30 connected to the power generator 1, and a fixing post 31 penetrating the plate 30. Alternatively, as shown in FIG. 6, each of the fixing apparatuses 3 may comprise a wire 33 connected at one end to a corresponding buoy 2 and fixed at the other end to an anchor 34 at the bottom of the water.

Each of the wings 15 comprises at least one circumferential wall 150 and a water reception plate 151 attached to the circumferential wall 150 of the wing 15, and is configured to move in a state wherein water flowing in nature is kept in a space defined in the wing 15 by the circumferential wall 150.

It is desirable that the water reception plate 151 is movably attached to the circumferential wall 150 of the wing 15.

That is, at least one guide bar 152 is provided inside the circumferential wall 150 to penetrate the water reception plate 150, and retarding projections 153 are formed at both sides of the guide bar 152, so that the water reception plate 150 moves along the guide plate 152 in a flowing direction of water, whereby the direction of water received in each of the wings 15 can be changed.

With such a configuration, the power generator of the present invention can generate power using the flow energy generated by the ebb and flow of the tide, and thus it can be installed in the sea.

When installing each of the pulleys 12 to the rail 11, the pulley 11 is provided with a pair of upper and lower wheels 120 in a plurality of rows such that the pair of wheels 120 can move in contact to upper and lower surfaces of the rail 11, respectively.

Furthermore, the power transmission gears 5 comprise a plurality of gears 51, each of which is formed at one side of each of the pulleys 12, and a gear 41 formed on a shaft 40 of the generator 4 and engaged with the gear 51, so that kinetic energy of the pulleys 12 can be transformed into rotational energy for the generator 4.

Operations of the hydraulic power generating system according to the present invention will be described as follows.

When the wings 15 are subjected to resistance of water flowing in nature, the pulleys 12 with the wings 12 start to move along the rail 11.

The gears 51 formed on the moving pulleys 12 are engaged with the gear 41 of the generator 4, so that the generator 4 rotates to generate electricity.

The plurality of gears respectively formed on the pulleys 12 continue to be engaged with the gear of the generator 4, so that the generator 4 keeps rotating to generate electricity.

As is apparent from the description, according to the present invention, the hydraulic power generating system is enhanced in its configuration, thereby improving endurance of the hydraulic power generating system, and allowing economical and convenient maintenance of the hydraulic power generating system, while not being restricted as to the locations where the power generator may be installed.

It should be understood that the embodiments and the accompanying drawings as described above have been described for illustrative purposes and the present invention is limited by the following claims. Further, those skilled in the art will appreciate that various modifications, additions and substitutions are allowed without departing from the scope and spirit of the invention as set forth in the accompanying claims.

What is claimed is:

1. A hydraulic power generating system, comprising:
   a power generator including a looped rail, a plurality of pulleys moving along the looped rail, a coupler to join the plurality of pulleys, a plurality of wings, each being installed to each of the pulleys to move the pulley by absorbing the flow energy of water, and a generator installed in the rail to generate electricity after receiving kinetic energy of the pulleys through power transmission gears;
   a buoy floating the power generator on the surface of the water; and
   a fixing apparatus restricting movement of the buoy and the power generator, wherein:
   the power transmission gears comprise a plurality of gears, each being formed at one side of each of the pulleys, and a gear formed on a shaft of the generator.

2. The hydraulic power generating system as set forth in claim 1, wherein each of the wings comprises at least one circumferential wall, and a water reception plate attached to the circumferential wall of the wing.

3. The hydraulic power generating system as set forth in claim 2, wherein each of the wings is provided with at least one guide bar inside the circumferential wall to penetrate the water reception plate, and with retarding projections formed at both sides of the guide bar.

4. The hydraulic power generating system, comprising:
   a power generator including a looped rail, a plurality of pulleys moving along the looped rail, a coupler to join the plurality of pulleys, a plurality of wings, each being installed to each of the pulleys to move the pulley by absorbing the flow energy of water, and a generator installed in the rail to generate electricity after receiving kinetic energy of the pulleys through power transmission gears;
   a buoy floating the power generator on the surface of the water; and
   a fixing apparatus restricting movement of the buoy and the power generator, wherein:
   each of the wings comprises at least one circumferential wall, and a water reception plate attached to the circumferential wall of the wing, and
   each of the wings is provided with at least one guide bar inside the circumferential wall to penetrate the water reception plate, and with retarding projections formed at both sides of the guide bar.

* * * * *